June 8, 1954

J. S. KAKUK ET AL 2,680,457

CYLINDRICAL WOODEN BILLET SAWING APPARATUS

Filed May 20, 1950

INVENTORS
J. S. Kakuk
BY S. J. Kakuk
Lieber & Lieber
ATTORNEYS.

June 8, 1954  J. S. KAKUK ET AL  2,680,457
CYLINDRICAL WOODEN BILLET SAWING APPARATUS
Filed May 20, 1950  2 Sheets-Sheet 2
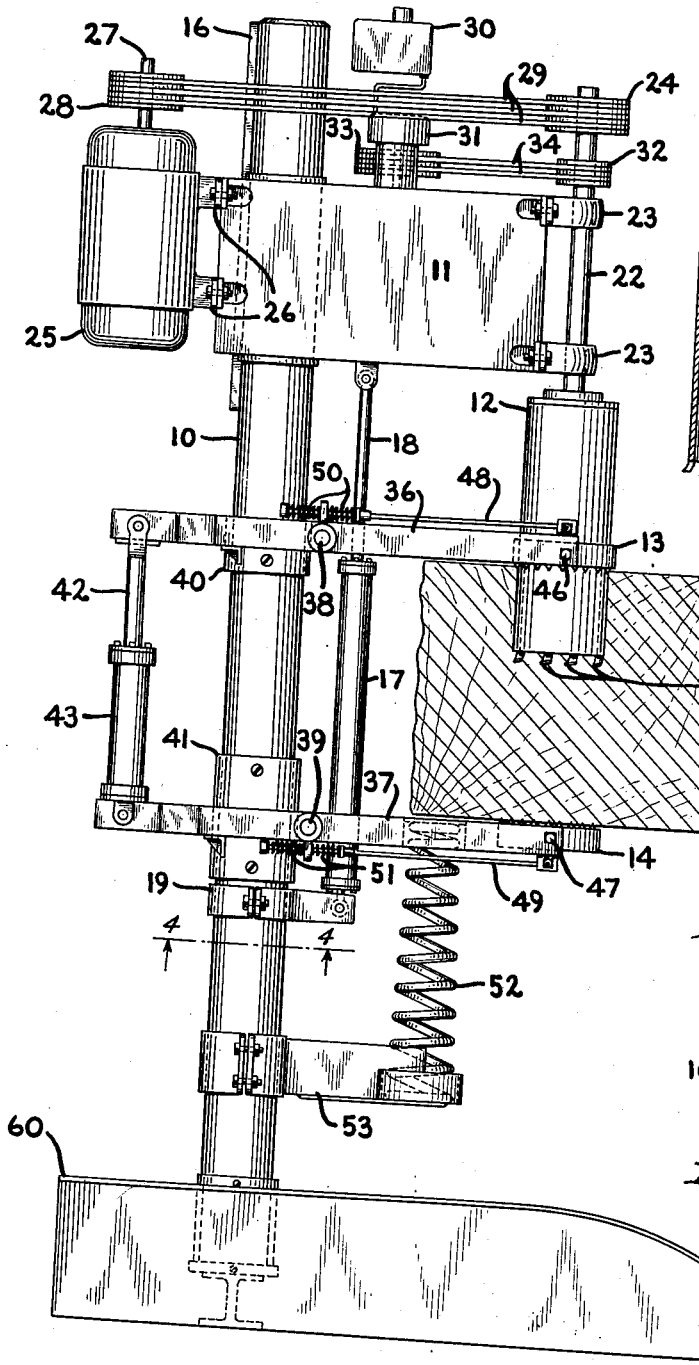
Fig.2.
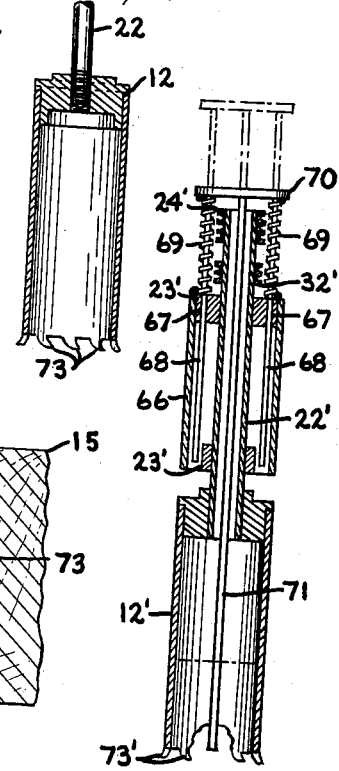
Fig.3.
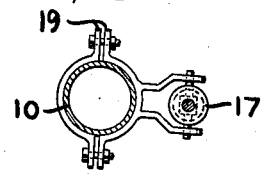
Fig.5.
Fig.4.
INVENTORS.
BY J. S. Kakuk
S. J. Kakuk
Lieber & Lieber
ATTORNEYS.

Patented June 8, 1954

2,680,457

UNITED STATES PATENT OFFICE 2,680,457

CYLINDRICAL WOODEN BILLET SAWING APPARATUS

Joseph S. Kakuk and Stephen J. Kakuk, Stephenson, Mich.

Application May 20, 1950, Serial No. 163,122

2 Claims. (Cl. 143—85)

The present invention relates generally to improvements in the art of producing cylindrical objects, and relates more particularly to improvements in the construction and operation of machines for sawing cylindrical billets from blocks of wood or the like.

A primary object of the invention is to provide an improved billet sawing apparatus which is simple, compact and durable in construction and which is moreover highly efficient and automatic in operation.

In the manufacture of cylindrical billets from large blocks of wood or the like, it has heretofore been common practice to first saw the block into a plurality of smaller polygonal shaped sections with the aid of an ordinary circular or band saw or other power operated sawing device and to thereafter shape the polygonal sections thus produced into cylindrical blocks or billets with the aid of a lathe or the like. This process is extremely time consuming and tedious as well as expensive and wasteful for the following reasons. First, the process requires two entirely separate operations, namely, an initial sawing operation in which the large block must be repositioned on and tied to the saw table several times and manually fed to the saw in each instance to produce the several sections, and a subsequent lathe operation in which each polygonal section must be individually shaped to cylindrical formation by removal of the excess material. In addition to the several time-consuming operations required in the customary billet production method, there is considerable resultant waste of the material from which the cylindrical billets are produced since it is necessary to initially saw the sections in wedge-shaped formation and to subsequently saw the wedge-shaped pieces into smaller polygonal sections before performing the lathe operations. Therefore, the number of cylindrical billets obtainable from each of the original sections is obviously limited, and furthermore each of the subsequent pieces must be of sufficient size to insure production of the billets of the desired diameter and excess stock is therefore ordinarily provided for such purpose.

It is therefore a more specific object of our present invention to provide an improved apparatus for producing cylindrical billets which obviates the disadvantages and objections attendant prior devices intended for such purposes.

Another specific object of this invention is to provide an improved machine for producing cylindrical billets from relatively large blocks which reduces waste to a minimum and which entirely eliminates the necessity of lathe operations.

Another specific object of the invention is to provide an improved cylindrical billet producing device which utilizes a cylindrical power operated saw and which is highly flexible, adjustable and automatic in operation.

Another specific object of our invention is to provide an improved billet sawing apparatus wherein extremely large and heavy blocks may be readily handled with ease by a novice and universally positioned for any desired center or off-center cuts with the aid of a novel work holder and positioning member.

Still another specific object of our present invention is to provide an improved power operated billet sawing machine which is exceedingly durable despite its simplicity and which may be operated to rapidly produce cylindrical billets from large bulky blocks in a safe and economical manner.

A further specific object of the present invention is to provide an improved unitary assemblage for efficient quantity production of cylindrical billets which embodies relatively few hydraulically or mechanically actuated parts which are readily accessible for inspection, replacement and/or repair.

An additional specific object of the present invention is to provide an improved billet sawing apparatus comprising, a support, a saw carrier movable along said support, a hollow cylindrical saw rotatably mounted on said carrier for movement therewith and having its axis parallel to the direction of movement thereof, and means for clamping and positioning a block to be sawed in the path of movement of said saw.

These and other specific objects and advantages of the present invention will be apparent from the following detailed description.

A clear conception of the several features constituting our present improvement and of the mode of constructing and of operating billet sawing apparatus built in accordance with this invention may be had by referring to the drawings accompanying and forming a part of this specification, wherein like reference characters designate the same or similar parts in the several views.

Fig. 2 is a side view of the apparatus in operation with the saw partially penetrating the wood block which is shown in section to more clearly reveal the operation;

Fig. 3 is a central vertical section through the improved cylindrical saw;

Fig. 4 is a section through the supporting column taken along the line 4—4 of Fig. 2;

Fig. 5 is a central vertical section through a somewhat modified drive shaft and saw.

Figures 1, 6:
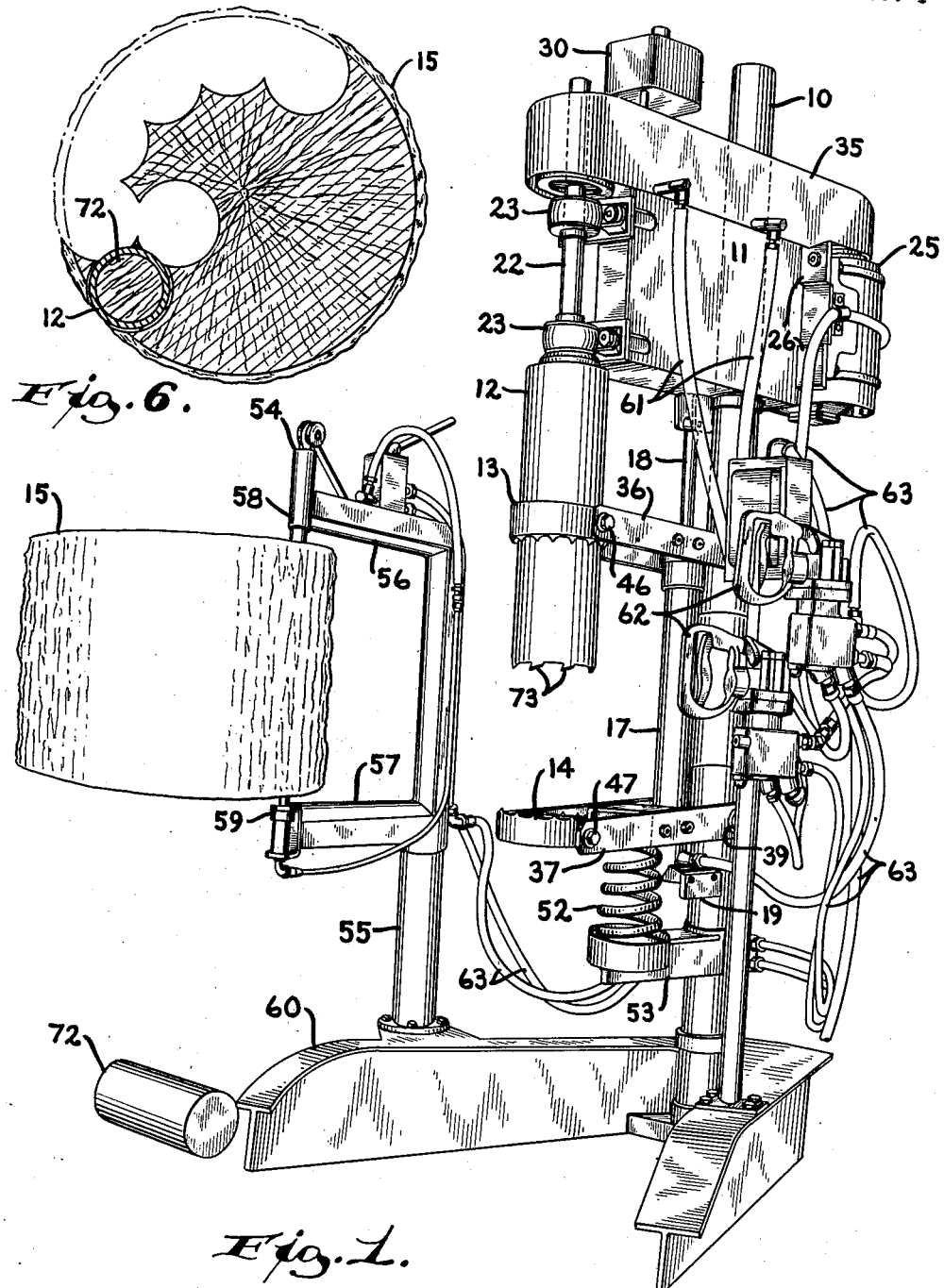
Fig. 1 is a perspective view of one of our improved machines showing the saw being retracted to starting position after completion of a cut and with the main block swung away from the saw.
Fig. 6 (Sheet 1) is a top view of a wood block from which several billets have been cut.

While the invention has been shown and described herein as being specifically applied to a vertical machine embodying hydraulic controls and having a single supporting column for the saw and motor carrier, it is not desired or intended to thereby unnecessarily restrict the scope or utility of the improvement; and it is also contemplated that specific descriptive terms used herein be given the broadest possible interpretation consistent with the disclosure.

Referring to the drawings, the typical improved billet sawing apparatus shown in Figs. 1 through 4 comprises, in general, a support or vertical column 10, a saw carrier or carriage 11 movable along the support 10, a hollow cylindrical saw 12 rotatably mounted on the carriage 11 for movement therewith, the saw 12 having its axis parallel to the direction of movement, and means including a pair of relatively movable jaws 13, 14 for clamping and positioning a block 15 of wood or the like to be sawed in the path of movement of the saw 12.

To guide the upper carriage 11 in its movement and prevent it from rotating about the column 10, a guide flange or key 16 may be provided on the column; and the carriage 11 may be raised or elevated to a predetermined starting position by means of a hydraulic ram consisting of a cylinder 17 and plunger 18, the cylinder 17 being conveniently mounted on the column 10 by means of a suitable bracket 19. The hollow cylindrical saw 12 is preferably carried by a drive shaft 22 journalled for rotation in bearings 23 and having one or more sheaves 24 thereon; and a motor 25 for driving the saw may likewise be conveniently mounted on the carriage 11 by means of suitable brackets 26, the motor shaft 27 having sheaves 28 adapted to receive belts 29 which also coact with the sheaves 24. If desired, the actuating fluid for the hydraulic system may be pumped from a reservoir 30 by a suitable pump 31 also driven with the saw shaft 22 through sheaves 32, 33 and belt or belts 34; and the various sheaves 24, 28, 32 and 33 and belts 29 and 34 may be protectively housed in a casing 35 or the like.

The clamp for clamping and positioning the block to be sawed in the path of movement of the saw 12 comprises a pair of jaws 13, 14, the arms 36, 37 respectively of which are preferably mounted on the column 10 for movement of the jaws relative to each other; and as shown, these arms 36, 37 may be respectively pivotally mounted as at 38, 39 on stationary brackets 40, 41 respectively which may be rendered adjustable along the column 17 if desired, with a hydraulic ram consisting of a plunger 42 and cylinder 43 pivotally attached to the arms 36, 37 respectively remote from the jaws. The jaws 13, 14 are preferably pivotally mounted as at 46, 47 respectively on the respective arms 36, 37 to permit automatic seating on the opposite faces of the block 15, the jaws 13, 14 being resiliently restrained against swinging motion by rods 48, 49 and springs 50, 51 respectively. To compensate for the downward pressure of the saw 12 during the cutting operation, the lower jaw 14 and its arm 37 are constantly resiliently urged upwardly and toward the saw 12 by a compression spring 52 which may be carried by a suitable bracket 53 also conveniently adjustably mounted on the column 10; and this resilient mounting also acts as a compensator in the event any obstructions are hit during the sawing operation. The jaws 13, 14 are also preferably of annular formation of slightly larger diameter than the diameter of the saw 12 so as to guide the saw in its movement during the cutting operation when disposed in axial alinement therewith, and these jaws are also preferably formed with teeth for more firmly clamping the block 15 therebetween.

To hold the block 15 for swinging movement into and out of the path of movement of the saw 12 and into position for positive clamping by the jaws 13, 14, means such as a swinging chuck 54 is provided. This work holding chuck 54 comprises an upright support or auxiliary column 55 having a clamping member with a pair of laterally projecting arms 56, 57 swingably mounted thereon. The arms 56, 57 carry outer clamping jaws in the form of hydraulic rams 58, 59 respectively, these rams likewise each consisting of a cylinder and plunger. As indicated, the clamping member or frame with its arms 56, 57 is swingable about the column 55 and the block 15 is likewise swingable about the axes of the jaws 58, 59 so that this block 15 may be swung to any position between the jaws 13, 14 in the path of movement of the saw 12. To provide a unitary structure, the columns 17, 55 may be supported by a common base 60 and project upwardly from the base parallel to each other. To actuate the various rams by means of liquid conducted from the reservoir 30 through hoses 61, suitable controls 62 may be provided and the fluid under pressure is conducted to the cylinders of the several rams through flexible tubing 63.

Referring to the modification shown in Fig. 5, suitable pusher means for positively ejecting the billets sawed upon completion of the cut may be provided. In this modification, the saw 12' is carried by a hollow shaft 22' provided with belt receiving sheaves 24', 32', the shaft being journalled for rotation in bearings 23'. The upper bearing 23' is preferably surrounded by a cage 66, and this bearing is also provided with guide holes or apertures 67 for slidably receiving rods 68 which are embraced by tension springs 69 attached at one end to the cage 66 or upper bearing and at the other end to an end head secured to the rods 68, the end head 70 also carrying a central pusher rod 71 which depends therefrom through the hollow shaft and coaxially within the saw 12'. In use of this modified device, the pusher rod 71 is constantly resiliently urged downwardly to the position shown in full lines in Fig. 5 by the action of the springs 69 to constantly urge the billet being sawed axially out of the cylindrical saw, the rods 68, 71, springs 69 and the end head 70 rising axially, as shown in dot-and-dash lines, as the saw 12 performs its work of cutting cylindrical billets 72 from the block 15; and when the saw reaches completion of its cut, the billet is automatically positively ejected therefrom by the rod 71.

In operation of the improved device, the block 15 to be sawed is first positioned between the jaws 58, 59 either centrally thereof or off center as shown in Fig. 1 and the jaws 58, 59 are then closed by fluid pressure upon actuation of the proper control 62. With the saw 12 raised to its starting position and the jaws 13, 14 swung to open position, the block 15 is then swung into position between the open jaws 13, 14; and to permit escape of the saw dust from the annular groove surrounding the billet to be cut during the sawing operation, the block 15 should be positioned as shown in Fig. 6 with the saw cut being made at the periphery of the block, thereby insuring escape of the saw dust from the groove. With the block thus positioned, the arms 36, 37 are actuated about their respective pivots 38, 39 by means of hydraulic fluid conducted to the cylinder 43 in response to the proper control 62, thereby causing the jaws 13, 14 to positively clamp the work 15 in position within the path of the saw. The saw is then rotated by means of its driving motor 25 and is caused to proceed axially through the work 15 by means of fluid pressure conducted to the cylinder 17 while the saw is driven by its motor. The saw has special teeth 73 which are directed outwardly so as to cause the saw dust to be thrown from the groove surrounding the billet being produced thereby peripherally of the work; and as the saw proceeds in its cut, it is guided by the jaws 13, 14 as shown in Fig. 2. When the cut is completed, the billet 72 is dropped through the lower open end of the saw which may thereafter be raised for re-positioning of the work 15 upon opening of the jaws 13, 14 and swinging of the work 15 to a new position therebetween. The rods 48, 49 and springs 50, 51 act to resiliently maintain the jaws in work engaging position, and if the downward pressure becomes too great during the sawing operation, the spring 52 permits downward movement of the block or work 15 to prevent damage to the machine. When the modified saw assemblage shown in Fig. 5 is utilized, the pusher rod 71 constantly resiliently bears on the work as the saw is rotated and moved axially so that the billet will be automatically ejected by the rod 71 upon completion of the cut, and the rod is prevented from rotating by reason of its mounting on the stationary bearings 23'.

As shown in Fig. 6, the swingable work holding chuck 54 permits wide variance in positioning of the block 15 so that there is practically no waste of material and any portion of the block 15 may be cut.

From the foregoing detailed description, it is apparent that our present invention provides an improved billet sawing machine which is simple and durable in construction and which is moreover highly efficient in actual use. The improved assemblage is of unitary construction and comprises relatively few parts, all of which are readily accessible for inspection, replacement and/or repair. By virtue of the improved device, cylindrical billets may be produced in a rapid manner in a single operation without need for constantly repositioning and securing the work and without need for an additional lathe operation, and the loss or waste of material is reduced to an absolute minimum. As hereinbefore indicated, the swinging chuck 54 permits almost universal positioning of the work without need for repeatedly manually re-positioning and securing the work, and the jaws 13, 14 positively clamp the work in position for the cutting operation and act as an effective guide for the saw. The working parts may be protectively housed in a suitable manner and the machine may be operated for rapidly producing cylindical billets 72 in an exceedingly safe manner and the entire assemblage may be conveniently operated by one man. Obviously, the various controls may be modified to suit the conditions and the parts may be electrically actuated instead of hydraulically. Devices produced in accordance with our invention have proven highly successful and satisfactory in actual commercial use.

It should be understood that it is not desired or intended to limit this invention to the exact details of construction or to the precise mode of operation herein shown and described for various modifications may occur to persons skilled in the art to which this invention pertains.

We claim:

1. Billet sawing apparatus comprising, a main support, a saw carrier movable vertically along said main support, a hollow cylindrical saw rotatably mounted on said carrier for vertical movement therewith and having its axis parallel to the direction of movement thereof, and work supporting means disposed laterally of said saw entirely out of the path of movement thereof, said supporting means including a fixed elongated vertical post extending parallel to the direction of movement of said saw and a pair of spaced arms extending laterally from and supported by said post for swinging movement about the vertical axis thereof, said arms having cooperating axially alined pivot jaws at the free outer ends thereof for clamping a block to be sawed therebetween whereby the block may be swung about said post and about said jaws to any desired position within the path of said saw.

2. Billet sawing apparatus comprising, a main support, a saw carrier movable vertically along said main support, a hollow cylindrical saw rotatably mounted on said carrier for vertical movement therewith and having its axis parallel to the direction of movement thereof, work supporting means disposed laterally of said saw entirely out of the path of movement thereof, said supporting means including a pair of spaced swingably supported and laterally extending arms having cooperating axially alined pivot jaws at the free ends thereof for clamping a block to be sawed therebetween whereby the block may be swung to any desired position within the path of said saw, and a pair of spaced relatively movable guide members carried by said main support and extending laterally therefrom into the path of movement of said saw, said guide members having annular clamping jaws cooperable with opposite ends of the block and axially alined with said saw for positively retaining the block in position while slidably receiving and guiding said saw in its movement.

References Cited in the file of this patent

UNITED STATES PATENTS

| Number | Name | Date |
|---|---|---|
| 786,849 | Sheppard | Apr. 11, 1905 |
| 802,184 | Farnum | Oct. 17, 1905 |
| 1,108,912 | Koons | Sept. 1, 1914 |
| 1,150,279 | Little | Aug. 17, 1915 |
| 1,667,022 | Wood | Apr. 24, 1928 |
| 1,685,572 | Onsrud | Sept. 25, 1928 |
| 1,685,613 | Onsrud | Sept. 25, 1928 |
| 2,351,435 | Kent | June 13, 1944 |
| 2,429,245 | Telles | Oct. 21, 1947 |
| 2,496,939 | Gonzalez | Feb. 7, 1950 |

FOREIGN PATENTS

| Number | Country | Date |
|---|---|---|
| 1,569 | Great Britain | July 17, 1854 |
| 4,333 | Great Britain | Feb. 28, 1895 |
| 15,028 | Great Britain | July 21, 1899 |
| 517,979 | Germany | Feb. 12, 1931 |